United States Patent [19]

Kvasnikoff et al.

[11] Patent Number: 4,894,216
[45] Date of Patent: Jan. 16, 1990

[54] CATALYTIC PROCESS FOR PRODUCING SULPHUR FROM H2S CONTAINING SOUR GAS

[75] Inventors: Georges Kvasnikoff, Monein; Jean Nougayrede, Pau; André Philippe, Orthez, all of France

[73] Assignee: Société Nationale Elf Aquitaine (Production), Paris, France

[21] Appl. No.: 75,746
[22] PCT Filed: Oct. 24, 1986
[86] PCT No.: PCT/FR86/00367
§ 371 Date: Jun. 25, 1987
§ 102(e) Date: Jun. 25, 1987
[87] PCT Pub. No.: WO87/02655
PCT Pub. Date: May 7, 1987

[30] Foreign Application Priority Data

Oct. 25, 1985 [FR] France .................. 85 15904

[51] Int. Cl.⁴ .................................... C01B 17/04
[52] U.S. Cl. ........................................ 423/574 R
[58] Field of Search ........................... 423/574 R

[56] References Cited

U.S. PATENT DOCUMENTS

| | | | |
|---|---|---|---|
| 2,889,207 | 11/1954 | Eliot | 423/574 R |
| 3,702,884 | 11/1972 | Hunt et al. | 423/574 R |
| 4,035,474 | 7/1977 | Kunkel et al. | 423/574 R |
| 4,054,642 | 10/1977 | Daumas et al. | 423/576 |
| 4,097,585 | 6/1978 | Fischer | 423/574 R |
| 4,180,554 | 1/1982 | Al-Muddaris | 423/574 R |
| 4,309,402 | 12/1979 | Goodin, Jr. et al. | 423/574 R |
| 4,426,369 | 1/1984 | Palm | 423/574 R |
| 4,430,317 | 2/1984 | Reed et al. | 423/574 R |
| 4,436,716 | 3/1984 | Kvasnikoff et al. | 423/574 R |
| 4,462,977 | 7/1984 | Reed | 423/574 R |
| 4,469,803 | 9/1984 | George | 423/576 |
| 4,479,928 | 10/1984 | Voirin | 423/574 R |
| 4,507,275 | 2/1985 | Reed | 423/574 R |
| 4,552,746 | 11/1985 | Kettner et al. | 423/574 R |
| 4,554,534 | 10/1985 | Dupin et al. | 423/574 R |
| 4,605,546 | 8/1986 | Voirin | 423/574 R |

FOREIGN PATENT DOCUMENTS

| | | | |
|---|---|---|---|
| 2538716 | 7/1984 | France | 423/574 R |
| 1211033 | 11/1970 | United Kingdom | 423/574 R |
| 1307716 | 2/1973 | United Kingdom | 423/574 R |

OTHER PUBLICATIONS

Translation of French Patent 2,538,716, by U.S. PTO.

Primary Examiner—John Doll
Assistant Examiner—Jeffrey Edwin Russel
Attorney, Agent, or Firm—Weiser & Stapler

[57] ABSTRACT

Catalytic process for producing sulphur from H2S-containing acid gas wherein the acid gas is subjected to a catalytic oxidation of CLAUS stoichiometry and to a catalytic CLAUS reaction phase with deposition of sulphur on the catalyst with periodic regeneration of the sulphur-laden catalyst and cooling of the regenerated catalyst. The gas used for the regeneration and for the cooling is tapped from the acid gas supplied to the catalytic oxidation and the gas issued from the regeneration is reintroduced into said acid gas after separation of the sulphur contained therein. The process is particularly applicable to the treatment of acid gases having a low H2S content.

31 Claims, 2 Drawing Sheets

FIG. I

CATALYTIC PROCESS FOR PRODUCING SULPHUR FROM H2S CONTAINING SOUR GAS

The invention concerns a catalytic process for producing sulphur from a $H_2S$- containing sour gas and, more particularly, from a sour gas containing less than 25% by volume of $H_2S$.

In classical units for producing sulphur from a gas containing $H_2S$, otherwise known as sour gas, this gas is brought into a thermal reaction stage in which one third of $H_2S$ is transformed into $SO_2$ in the presence of oxygen or air at a temperature at least equal to 900° C. The gaseous reaction mixture issued from the thermal reaction stage contains a certain quantity of elementary sulphur as well as $H_2S$ and $SO_2$ in a $H_2S:SO_2$ molar ratio equal to about 2:1. This gaseous mixture is subjected to an indirect cooling to recover the calories that it contains by producing steam, and the cooled mixture is directed towards a condensation step in which the greatest proportion of the sulphur contained in the gaseous mixture is separated through condensation. In order to increase the sulphur production, which at this stage is still very incomplete, the gaseous mixture issued from the sulphur condensation step is heated then led into one or several catalytic conversion stages containing a suitable catalyst, known as a CLAUS catalyst, in contact with which $SO_2$ reacts with $H_2S$ to form a further quantity of sulphur. The residual gases issued from the last catalytic conversion stage are directed towards an incineration stage, of which the effluents are thereafter rejected into the atmosphere. Prior to being directed towards the incineration stage, the gases issued from the last catalytic conversion stage can be sent into a CLAUS reaction stage, called low temperature stage, comprising at least two catalytic converters mounted in parallel and operating alternately in CLAUS reaction phase, at a temperature low enough for the sulphur formed through the reaction of $H_2S$ on $SO_2$ to be deposited on the catalyst, then in regeneration/cooling phase through sweeping by means of a non-oxidizing gas having first a temperature comprised between 200° and 500° C. to vaporize the sulphur deposited on the catalyst then a temperature lower than about 160° C. to cool the regenerated catalyst to the temperature required for operating the CLAUS reaction.

The utilization of a thermal reaction stage to oxidize into $SO_2$ the required quantity of $H_2S$ is only possible if the sour gas has a $H_2S$ content higher than about 15 to 20% by volume and preferably at least 25% by volume. For $H_2S$ contents of the sour gas lower than this limit, it is not possible to maintain a sufficient flame temperature, i.e. of about 900° C. and above, to obtain stable combustion of $H_2S$ without considerable and expensive modifications to the installation. Furthermore, this high temperature thermal reaction leads to transforming a proportion of the sulphur produced into COS and $CS_2$ when the sour gas contains $CO_2$ and/or hydrocarbons. The formation of these organic sulphur-containing compounds is prejudicial since they are only partially transformed into sulphur in the catalytic conversion stages, and this consequently contributes to reducing the overall sulphur production rate of the sulphur unit.

To allow production of sulphur from a gas having a low $H_2S$ content, it has been proposed to modify existing conventional installations through replacing the thermal reaction stage by a catalytic oxidation stage in which the sour gas is contacted, in the presence of a $H_2S$ oxidation catalyst in CLAUS stoichiometry, with a controlled quantity of a gas containing free oxygen to form a gaseous effluent containing $H_2S$ and $SO_2$ in a molar ratio substantially equal to 2:1 as well as some elementary sulphur. The said gaseous effluent is thereafter directed, after separation of the sulphur that it contains, to the catalytic conversion or/and to the low temperature CLAUS reaction stage to form a fresh quantity of sulphur, then directed towards the incineration stage as indicated herein-above in the case of conventional sulphur producing units.

In sulphur units of the type comprising a thermal stage or a catalytic oxidation stage, that also include a low temperature CLAUS reaction stage, an efficient manner to carry out the regeneration of the sulphur-laden CLAUS catalyst of this low temperature CLAUS reaction stage consists in incorporating to the sweeping gas a certain amount of $H_2S$, which thus allows to confer upon the regenerated CLAUS catalyst an activity close to the original activity even after a high number of regenerations. The sweeping gas used for the regeneration is usually formed by mixing to a substantially inert carrier gas, for example constituted by nitrogen or a part of the purified residual gases from the sulphur unit, a suitable quantity of a gas containing $H_2S$ and especially of the sour gas treated in the sulphur unit.

The object of the invention is a catalytic process for producing sulphur from a sour gas containing $H_2S$, and more particularly from a sour gas having a low $H_2S$ content, which comprises a catalytic oxidation phase of $H_2S$ into sulphur, and a low temperature CLAUS reaction regenerative phase and in which a regeneration of the sulphur-laden low temperature CLAUS catalyst is performed by sweeping by means of a non-oxidizing hot gas containing $H_2S$, the said regeneration being performed in a particular manner from the sour gas containing $H_2S$.

The catalytic process according to the invention for producing sulphur from a sour gas containing $H_2S$ is of the type in which the said sour gas is contacted, at a temperature higher than 150° C. and in the presence of a $H_2S$ oxidation catalyst, with a controlled quantity of a gas containing free oxygen to form a gaseous effluent containing $H_2S$ and $SO_2$ in a $H_2S:SO_2$ molar ratio substantially equal to 2:1 as well as elementary sulphur, the said gaseous effluent, after cooling to a temperature lower than about 160° C. and possible separation of a large proportion of the sulphur that it contains, is brought into contact with a low temperature CLAUS catalyst operating, at a sufficiently low temperature for the sulphur formed by reaction of $H_2S$ on $SO_2$ to be deposited on the catalyst, to produce a fresh quantity of sulphur and a practically desulphurated gaseous stream that is evacuated, for example into the atmosphere, after having possibly incinerated it, and the sulphur-laden low temperature CLAUS catalyst is periodically subjected to a regeneration by sweeping by means of a non-oxidizing gas containing $H_2S$ and having a temperature between 20° C. and 500° C., the said regeneration being followed by a cooling of the catalyst to below 160° C., and it is characterized in that a part or the whole of the sour gas to be treated is used, prior to placing it in the presence of the gas containing the free oxygen, to form the sweeping gas which acts, after heating to the appropriate temperature comprised between 200° C. and 500° C., for the regeneration of the sulphur-laden CLAUS catalyst and in that the sour gas, which is brought with the free oxygen-containing gas into contact with the oxidation catalyst, is formed by the sweeping gas issuing from the regeneration, possibly freed by condensation from a large proportion of the sulphur that it contains, to which is added, if it exists, the initial quantity of sour gas not used in order to form the sweeping gas acting in the regeneration.

According to one embodiment of the invention, the whole of the sour gas to be treated is used to form the sweeping gas acting in the regeneration of the sulphur-laden CLAUS catalyst.

According to another embodiment, a fraction of the gas to be processed is tapped, prior to incorporating there into the free oxygen-containing gas, and the gaseous fraction thus tapped is used to form the sweeping gas acting to regenerate the sulphur-laden CLAUS catalyst and the sweeping gas issuing from the regeneration is reintroduced, after having possibly been freed from the greatest proportion of the sulphur that it contains by condensation, in the sour gas brought to the oxidation, upstream of the addition point of the free oxygen-containing gas to the said sour gas.

Preferably, the sweeping gas issuing from the regeneration is introduced into the sour gas brought to the oxidation between the addition point of the gas containing free oxygen and the point of topping the sour gas fraction used to form the sweeping gas acting in the regeneration.

The sour gas, i.e. the gas containing $H_2S$ that is treated for producing sulphur by the process according to the invention can have various origins. In particular, such a sour gas can be a natural gas or be a gas issuing from the gaseification of coal or heavy oils, or even a gas resulting from the hydrogenation of a residual gas containing sulphur-based compounds such as $SO_2$, mercaptans, COS, $CS_2$ which can be converted into $H_2S$ under the action of hydrogen or of water vapor. The present invention applies more particularly to the treatment of sour gases containing less than 25% of $H_2S$ and preferably from 0.2 to 20% of $H_2S$ by volume. Sour gases having a high $H_2S$ content can also be treated by this process, although in this case it is preferable to use the classical sulphur producing process comprising a thermal reaction. The sour gas can further contain organic sulphur compounds such as mercaptans, COS, $CS_2$, in an overall quantity able to range up to about 1% by volume.

The free oxygen-containing gas used for the $H_2S$ oxidation of the sour gas is generally air, although it is possible to use pure oxygen, oxygen-enriched air, or furthermore mixtures in various proportions, of an inert gas other than nitrogen and oxygen. The sour gas and the free oxygen-containing gas can be brought separately into contact with the oxidation catalyst. However, it is preferable to mix first of all the said sour gas with the free oxygen-containing gas and to bring the mixture thus produced into contact with the oxidation catalyst. The gas containing free oxygen is used in a controlled quantity so that together with $H_2S$ there is a quantity of oxygen corresponding to that necessary to partially oxidize $H_2S$ into $SO_2$ so as to form a gaseous effluent containing $H_2S$ and $SO_2$ in a $H_2S:SO_2$ molar ratio of about 2:1 as well as elementary sulphur.

The control of the quantity of the free oxygen-containing gas is performed in any manner known per se, by determining the value of the $H_2S:SO_2$ molar ratio in the oxidation effluent and by varying the flow-rate of the free oxygen-containing gas used for oxidation in response to a control value elaborated from the results of these determinations, in such a manner as to maintain the said $H_2S:SO_2$ molar ratio at a value of 2:1.

The contacting times of the gaseous reaction medium with the oxidation catalyst can range from 0.5 to 10 seconds, these values being given under normal pressure and temperature conditions.

The oxidation catalyst can be selected from among the various catalysts adapted to promote $H_2S$ oxidation, by the oxygen of the free oxygen-containing gas, in CLAUS stoechiometry i.e. according to the following reaction scheme:

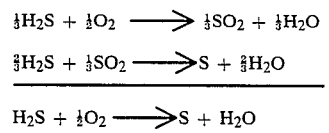

$$\tfrac{1}{3}H_2S + \tfrac{1}{2}O_2 \longrightarrow \tfrac{1}{3}SO_2 + \tfrac{1}{3}H_2O$$
$$\tfrac{2}{3}H_2S + \tfrac{1}{3}SO_2 \longrightarrow S + \tfrac{2}{3}H_2O$$

$$H_2S + \tfrac{1}{2}O_2 \longrightarrow S + H_2O$$

which leads to the production of a gaseous effluent containing elementary sulphur as well as $H_2S$ and $SO_2$ in a $H_2S:SO_2$ molar ratio substantially equal to 2:1.

In particular, the oxidation catalyst to be used in the process according to the invention can be advantageously selected from among the group comprising:

(I) the catalysts resulting from the association of at least one compound of a metal selected from among Fe, Ni, Co, Cu and Zn with an alumina and/or silica support, that are described in French Pat. No. 75 31769 (publication No. 2 327 960) dated Oct. 17, 1975;

(II) titanium oxide-based catalyst and in particular those catalysts resulting from the association of titanium oxide and an alkaline-earth metal sulfate such as calcium sulfate, which are proposed in French Pat. No. 81 05029 (publication No. 2 501 532) dated Mar. 13, 1981;

(III) the catalysts resulting from the association of at least one compound of a metal selected from the group containing Fe, Cu, Cd, Zn, Cr, Mo, W, Co, Ni and Bi and possibly at least one compound of a noble metal such as Pd, Pt, Ir and Rh with a silica and/or titanium oxide support, the said support possibly containing a small proportion of alumina, that are disclosed in French Pat. No. 81 15900 (publication No. 2 511 663) dated Aug. 19, 1981;

(IV) catalysts formed by associating at least one compound of a metal selected from among the group cited above in (III) with a support consisting of an active alumina thermally stabilized especially by a small quantity of at least one rare earth oxide, that are described in published German patent application Ser. No. 3 403 328.

Advantageously, it is possible to constitute the oxidation catalyst by using a catalyst of the (II), (III) or (IV) type followed by a desoxygenation catalyst and particularly a type (I) catalyst, with the additional advantage that the gaseous effluent issued from the oxidation no longer contains oxygen, which is desired in order to prevent a disactivation of the CLAUS catalyst in the subsequent phase of the treatment.

The oxidation reaction of $H_2S$ in CLAUS stoichiometry can be performed at temperatures comprised between 150° C. and 1000° C. and the oxidation catalyst is selected from among those which present sufficient thermal stability at the temperature prevailing during oxidation. Therefore, catalysts of type (I) or including a catalyst of this type can be used up to about 400° C., type (II) catalysts up to about 500° C., type (III) catalysts up to about 700° C. and type (IV) catalysts up to about 1000° C.

To establish a convenient oxidation temperature, the mixture of sour gas and free oxygen-containing gas or each of these said gases when they are separately brought into contact with the oxidation catalyst, is subjected to a pre-heating at a temperature compatible with the temperature at which it is desired to perform the $H_2S$ oxidation, this pre-heating generally being carried out by indirect heat exchange with a hotter fluid.

The gaseous effluent issued from the oxidation contains sulphur vapor as well as $H_2S$ and $SO_2$ in a $H_2S:SO_2$ molar ratio equal to about 2:1. This gaseous effluent is subjected to cooling in order to bring its temperature to a value lower than 160° C. and so that the greatest proportion of the sulphur contained therein is separated by condensation, then it is contacted with the CLAUS catalyst at a temperature low enough for the sulphur formed by the $H_2S$ reaction on $SO_2$ to be deposited on the catalyst, this temperature being advantageously comprised between 120° C. and 140° C., to form a fresh quantity of sulphur. Periodically, the regeneration of the sulphur-laden CLAUS catalyst is performed by sweeping the said catalyst by means of a non-oxidizing $H_2S$-containing gas and having a temperature comprised between 200° C. and 500° C., the said regeneration being followed by a cooling of the regenerated catalyst. The reaction of $H_2S$ with $SO_2$ on the low temperature CLAUS catalyst is generally performed by operating in a plurality of catalytic conversion zones, which function so that at least one of these said zones is in regeneration/cooling phase while the other(s) is(are) in CLAUS reaction phase. It is possible to envisage operating with one or several zones in phase reaction, at least one zone in regeneration phase and at least one zone in cooling phase.

The purified gas issued from the contacting with the low temperature CLAUS catalyst is possibly subjected to a thermal or catalytic incineration, prior to being evacuated and for example being rejected into the atmosphere.

The regeneration of the sulphur-laden CLAUS catalyst is produced by sweeping the said catalyst by means of the sweeping gas, which has been formed as indicated herein-above and heated to an appropriate temperature comprised between 200° C. and 500° C., the sweeping gas issued from the regeneration being used as indicated herein-above, after possible separation of the greatest proportion of the sulphur contained therein by condensation, in order to form the sour gas, which is brought together with the free oxygen-containing gas in contact with the oxidation catalyst.

The regenerated CLAUS catalyst is subjected to cooling in order to bring it to a temperature lower than 160° C. and more particularly substantially equal to that at which the reaction between $H_2S$ and $SO_2$ is performed on the low temperature CLAUS catalyst. This cooling can be more especially carried out by decreasing the temperature of the sweeping gas used for the regeneration to a convenient temperature and by sweeping further the catalyst at this temperature until the said regenerated CLAUS catalyst has been cooled to the required temperature. It is possible to cool the regenerated low temperature CLAUS catalyst by sweeping it with part of the sour gas to be treated tapped when the said sour gas is at a temperature lower than 160° C. and has not yet been put into the presence of the oxygen-containing gas and by reinjecting the cooling gas, after passage upon contact of the CLAUS catalyst, in the sour gas upstream of the meeting point of the said sour gas with the free oxygen-containing gas, this reinjection being performed preferably by the circuit allowing to reinject into the sour gas the sweeping gas used for the regeneration of the low temperature CLAUS catalyst.

Where necessary, the gaseous effluent issued from the $H_2S$ oxidation can be brought into contact with a "high temperature" CLAUS catalyst, i.e. functioning at temperatures sufficiently high for the sulphur formed by reaction of $H_2S$ on $SO_2$ to remain in the vapor state, prior to being put in the presence of the low temperature CLAUS catalyst. This contacting of the gaseous effluent with the "high temperature" CLAUS catalyst is generally performed at temperatures comprised between 200° C. and 450° C. by operating in a single catalytic conversion zone or in a plurality of such zones disposed in series and the working temperatures of which range decreasingly from one zone to the next, with, after a contacting in any one of the said zones, separation of the sulphur contained in the gaseous reaction medium issued from the zone involved by condensation then heating of the said sulphur-free reaction medium prior to the injection of this reaction medium in the following zone.

The "low temperature" or high temperature type CLAUS catalyst with which the $H_2S$ oxidation effluent is contacted can be any one of the catalysts adapted to be used for promoting the reaction between $H_2S$ and $SO_2$ leading to sulphur. It can especially consist of alumina, bauxite, silica, natural or synthetic zeolite, catalysts of type (I) mentioned herein-above or in a mixture of such products.

When the gaseous effluent of the $H_2S$ oxidation is contacted with a "high temperature" CLAUS catalyst, prior to bringing it into contact with the "low temperature" CLAUS catalyst, it is advantageous, in particular when the $H_2S$ oxidation catalyst is one of the catalysts defined herein-above in groups II to IV, to pass the gaseous effluent issued from the oxidation in contact with a desoxygenation catalyst, and especially a catalyst from group (I) such as mentioned herein-above, prior to contacting it with the "high temperature" CLAUS catalyst.

BRIEF DESCRIPTION OF THE DRAWINGS

The invention will become more apparent from the following description of two embodiments of the invention using the devices represented schematically on FIGS. 1 and 2 of the appended drawing.

The device presented on FIG. 1 associates an oxidation reactor 1 and two CLAUS catalytic converters 2a and 2b the said converters being mounted in parallel. The oxidation reactor comprises a gas supply pipe 3 and outlet pipe 4 on which is mounted a condensor 5. A gas supply tubing 7 is connected to pipe 3 through a first and a second heating device, respectively 8 and 9. The tubing 7 is also connected to pipe 3 by a derivation 11 mounted between the heating devices 8 and 9, this derivation being fitted with a valve 12 having an adjustable orifice. The portion of pipe 3 between the tubing 7 and the derivation 11 is provided with a valve 10 with an adjustable orifice. Adjacent to the inlet of the oxidation reactor the pipe 3 is provided in derivation with a gas addition tubing 13, this tubing being fitted with a valve 14 having an adjustable orifice controlled by a regulating device 15 in function of the $H_2S:SO_2$ molar ratio in the gaseous effluent passing into the outlet pipe 4 of the oxidation reactor. A device 16 for regulating the temperature at the inlet of the oxidation reactor comprises a temperature measuring probe 17 mounted in the pipe 3 between the input of the oxidation reactor and the tubing 13 and controls the rate of opening of the valves 10 and 12.

Figure 1:
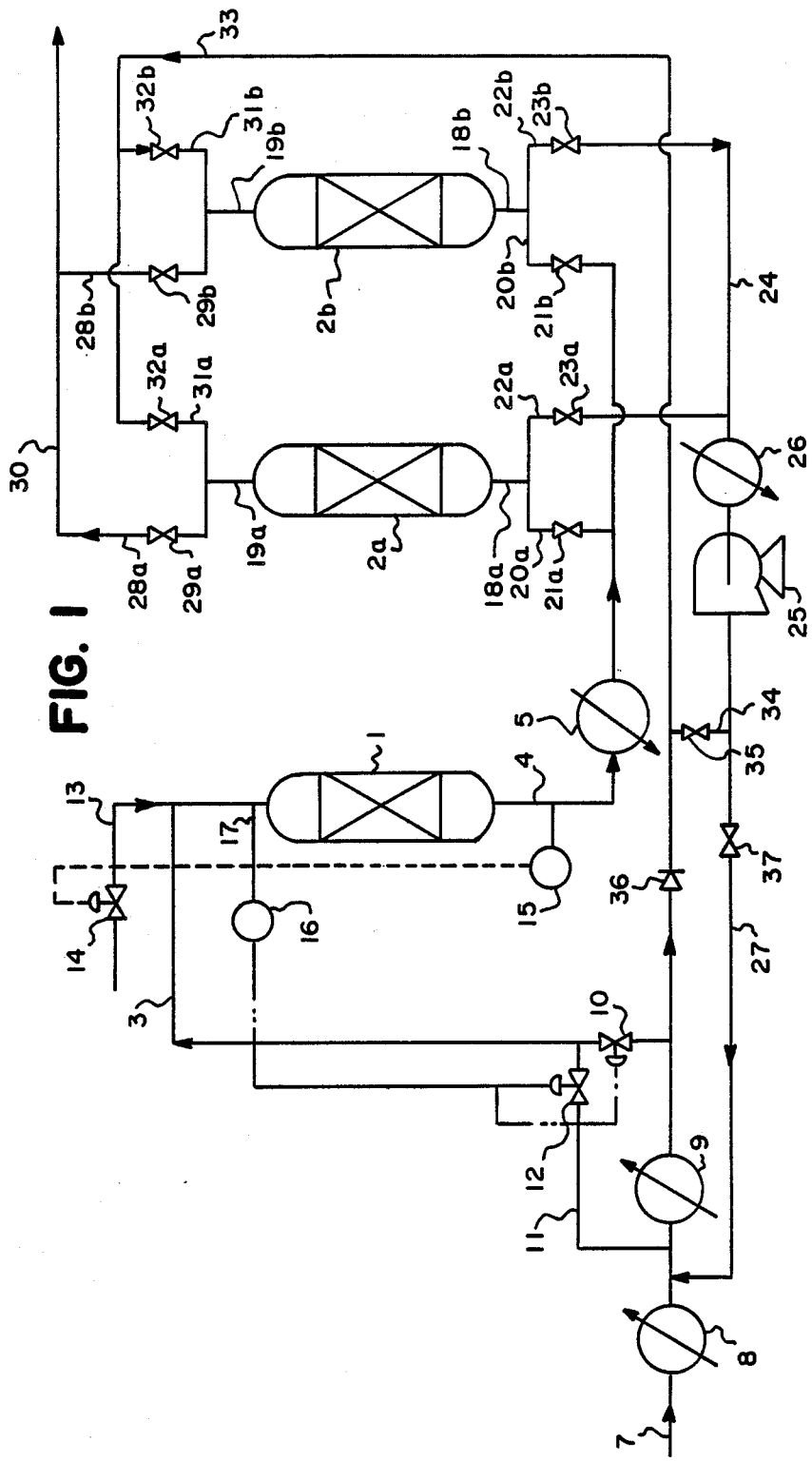

The catalytic converters 2a and 2b are each filled with a CLAUS catalyst and are provided with a first pipe, respectively 18a and 18b, and a second pipe, respectively 19a and 19b, located on either side of the catalyst. The pipe 18a of the converter 2a is connected on the one hand, through a pipe 20a provided with a valve 21a, to the pipe 4, downstream from the condensor 5, and on the other hand, by a pipe 22a provided with a valve 23a, to a pipe 24 itself connected to the aspiration of a blower 25 and upon which is mounted a sulphur condensor 26, the said condensor being disposed between the pipe 22a and the blower 25. The thrust of the blowing device 25 is connected to the pipe 7 by a pipe 27, which issues into the pipe 7 between the heating devices 8 and 9.

Furthermore, the pipe 18b of the converter 2b is connected on the one hand, by a pipe 20b provided with a valve 21b, to the outlet pipe 4 of the oxidation reactor, downstream from the junction of the pipe 20a with the said pipe 4 and on the other hand, by a pipe 22b provided with a valve 23b, to the pipe 24 at a point of this latter which is further from the condensor 26 than the junction point of the pipe 24 and the pipe 22a.

The pipe 19a of the converter 2a is connected on the one hand, by a pipe 28a provided with a valve 29a, to a pipe 30 for evacuating the purified gas towards an incineration reactor (not represented), itself connected to a chimney stack, and on the other hand, by a pipe 31a provided with a valve 32a, to a pipe 33 mounted in derivation on the pipe 7 at the junction point of this latter with the pipe 3. Furthermore, the pipe 19b of the converter 2b is connected, on the one hand, by a pipe 28b fitted with a valve 29b, to the pipe 30 for evacuating the purified gas and on the other hand, by a pipe 31b fitted with a valve 32b, to the pipe 33. The pipes 27 and 33 are connected by a tubing 34 equipped with a valve 35 and mounted downstream from the blower 25. The portion of the pipe 33 located between the pipe 3 and the tubing 34 is fitted with a non return valve 36 authorizing circulation of the gases from the exchanger 9 towards the converters 2a and 2b while the portion of the pipe 27 downstream from the tubing 34 is provided with a valve 37.

Figure 2:
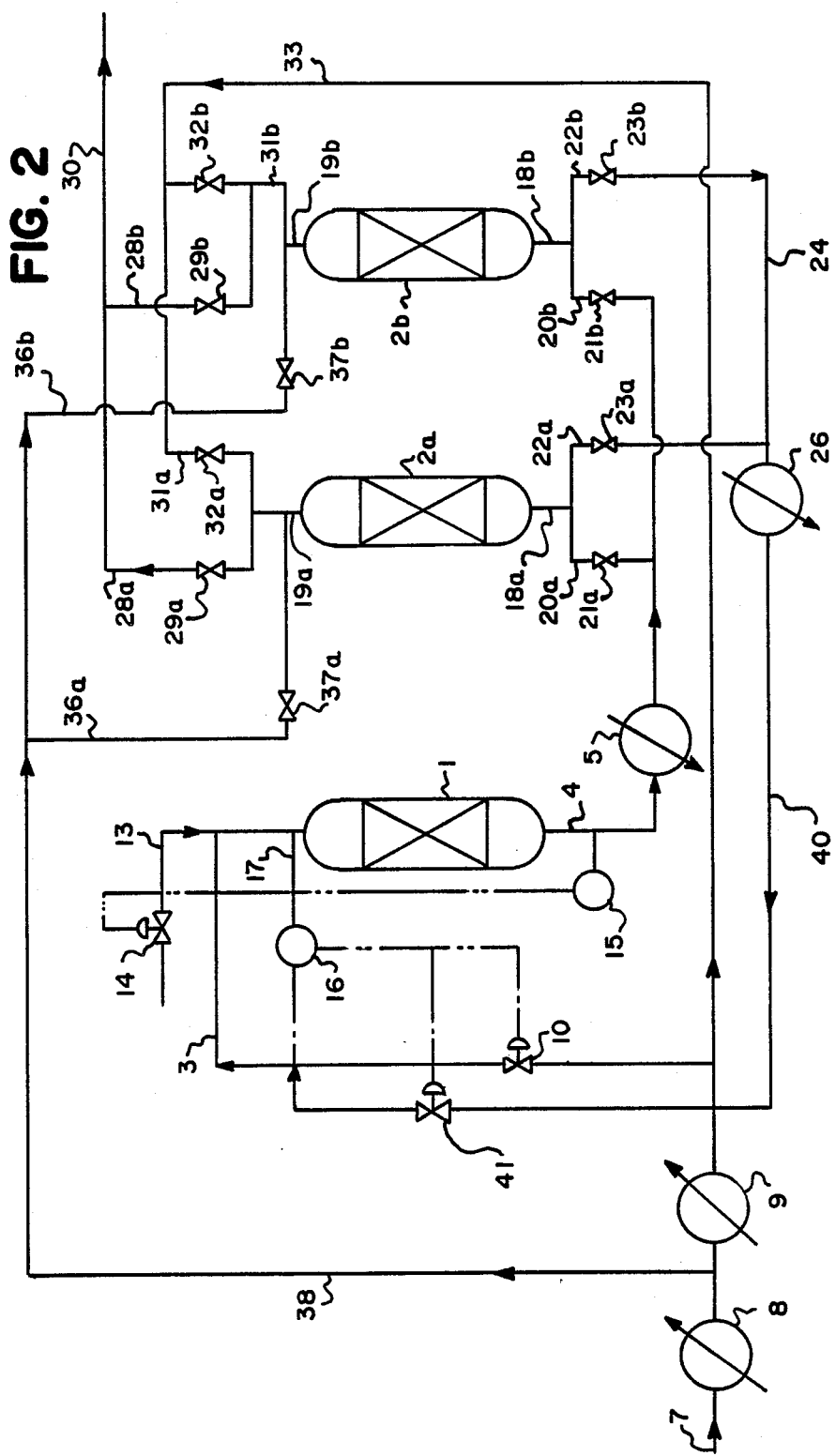

In one alternative of this device such as represented on FIG. 2, the blower 25, the pipe 27, the derivation 11 with its valve 12, and the pipe 34 are suppressed, while on the one hand the pipe 19a of the converter 2a and the pipe 19b of the converter 2b are each provided with a tubing, respectively 36a and 36b, mounted in derivation and fitted with a valve, respectively 37a and 37b, these two tubings each being connected to a pipe 38 mounted in derivation on the pipe 7 between the two heating devices 8 and 9. Furthermore, the pipe 24 is extended downstream by a condensor 26 through a tubing 40 provided with a valve 41 having an adjustable orifice and issuing into the pipe 3 between the valve 10 and the junction of the said pipe with the tubing 13. The valves 10 and 41 are controlled by the temperature regulating device 16.

Operating of the process is schematically performed in the following manner:

With reference to FIG. 1, it is assumed that the converter 2a is in CLAUS reaction phase whereas the converter 2b is in regeneration/cooling phase, the valves 21a, 23b, 29a, 32b and 37 being opened up while the valves 21b, 23a, 29b, 32a and 35 are shut down.

The sour gas to be treated, particularly a sour gas poor in $H_2S$, arrives through the pipe 7 and passes into the heating devices 8 and 9, after which it is brought to the oxidation reactor 1 after having received, through the tubing 13, a controlled quantity of gas containing free oxygen and especially air for the $H_2S$ oxidation that it contains in CLAUS stoichiometry, i.e. to oxidize one third of $H_2S$ into $SO_2$. The temperature of the sour gas and free oxygen-containing gas mixture entering into the oxidation reactor 1 has a value higher than 150° C., for example comprised between 180° C. and 300° C., and compatible with the maximal operating temperature of the oxidation catalyst. Said temperature of the sour gas and free oxygen-containing gas is controlled by a regulating device 16 which, from the temperature values measured by the probe 17, acts upon the valves 10 and 12 having adjustable orifices in order to control the sour gas flow-rates at different temperatures arriving in the pipe 3 through the pipe 7 and by the derivation 11, respectively.

The oxidation reactor 1 contains an oxidation catalyst adapted to promote the partial oxidation of $H_2S$ in CLAUS stoichiometry, the said catalyst being, for example, selected from among the catalysts of types (I) to (IV) defined herein-above and being able especially to consist of a layer of a catalyst of type (II), (III) or (IV) that is followed by a layer of a catalyst of type (I). Through the outlet pipe 4 of the oxidation reactor 1 issues a gaseous effluent containing elementary sulphur as well as $H_2S$ and $SO_2$ in a $H_2S:SO_2$ molar ratio equal to about 2:1. Maintaining this ratio at the desired ratio of 2:1 is ensured by the regulating device 15 which, from the measures taken in the gaseous effluent passing into the pipe 4, elaborates the instantaneous value of the said ratio and acts upon the valve 14 having an adjustable orifice mounted on the tubing 13 to control the flow-rate of the free oxygen-containing gas injected by the said tubing into the sour gas circulating in the pipe 3 to bring said instantaneous value in coincidence with the theoretical value of 2:1.

The gaseous effluent issued from the oxidation reactor 1, through the pipe 4, is cooled to a temperature lower than 150° C., for example between 120° C. and 140° C. in the condensor 5, then it is introduced into the converter 2a by a pipe 20a, through the valve 21a, and the pipe 18a.

In this converter, which like converter 2b contains a CLAUS catalyst, for example alumina or type (I) catalyst such as mentioned herein-above, $H_2S$ and $SO_2$ contained in the gaseous effluent react upon each other, in contact with the CLAUS catalyst, to form sulphur according to the following reaction:

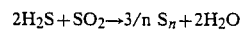
$2H_2S + SO_2 \rightarrow 3/n\ S_n + 2H_2O$

At the temperatures of the gaseous effluent brought into contact with the CLAUS catalyst, the sulphur formed by the reaction of $H_2S$ on $SO_2$ is deposited on the said catalyst. Through the pipe 19a of the converter 2a issues a purified gas having an extremely low sulphur compound content, which is directed by the pipe 28a, through the valve 29a, into the pipe 30 for evacuating the purified gas leading the said gas towards an incineration reactor.

One fraction of the sour gas passing into the pipe 7 is tapped after heating device 9, by the pipe 33. This fraction is sent into the converter 2b along the pipe 31b, through the valve 32b, and the pipe 19b and sweeps the sulphur-laden CLAUS catalyst contained in the said converter. A stream of sweeping gas carrying along the vaporized sulphur issues from the converter 2b through the pipe 18b and flows along the pipe 22b, through the valve 23b, and the pipe 24 up to the sulphur condensor 26, in which the sulphur is separated by condensation.

At the outlet of the condenser 26, the sweeping gas stream is sucked by the blower 25 in order to be sent back, through the pipe 27, into the sour gas issuing from the heating device 8 mounted on the pipe 7.

After sufficient sweeping of the catalyst contained in the converter 2b by the sweeping gas of the heating device 9 in order to completely remove the sulphur deposited upon the said catalyst and reactivate this latter through action of $H_2S$ contained in the sweeping gas, the valve 25 is opened up and the valve 37 is closed down in such a manner as to continue the sweeping with a gas constituted by cold gas issued from the sulphur condensor 26 and sent back by the blower 25. The sweeping of the catalyst by the cold gas, whose temperature is lower than about 169° C., is performed long enough to cool down the regenerated catalyst contained in the converter 2b.

When the said catalyst has been cooled to a convenient temperature allowing the contacting of the catalyst with the gaseous effluent issued from the oxidation reactor, the functions served by the converters 2a and 2b are permutated, i.e. the converter 2b is brought into CLAUS reaction phase and the converter 2a is brought into regeneration/cooling phase by closing down the valves 21a, 23b, 29a, 32b and 35 and by opening up the valves 21b, 23a, 29b, 32a and 37 then into the cooling stage by opening up valve 35 and shutting down valve 37. During the transient of period of permutation of the role of the converters 2a and 2b the sweeping gas is made to circulate in a pipe (not represented) by-passing the said converters.

In the embodiments that utilize the device schematically represented on FIG. 2, the process is performed in a manner similar to that explained herein-above with reference to FIG. 1. By supposing once again that the converter 2a is in CLAUS reaction phase and the converter 2b in regeneration/cooling phase, the valves 21a, 23b, 29a and 32b are opened up and 32a, 37a and 37b closed down. The sour gas to be treated arrives through the pipe 7 and after passage in the heating devices 8 and 9 it is brought through the pipe 3 to the oxidation reactor 1 after addition of a controlled quantity of the free oxygen-containing gas injected through the tubing 13. The temperature of the mixture of sour gas and free oxygen-containing gas is controlled by the regulation device 16 that acts upon the valves 10 and 41, each having an adjustable orifice mounted respectively on pipes 3 and 40.

The $H_2S$ oxidation step of the sour gas in the oxidation reactor 1, then the CLAUS reaction step in the converter 2a and the regeneration of the sulphur-laden catalyst contained in the converter 2b through sweeping with the hot gas passing through the pipe 33 are carried out as indicated for performing the process in reference to FIG. 1 with the difference that the gas issued from the condensor 26, and thus presenting a temperature equal to that prevailing in this condensor and for example about 130° C., is brought back, along the pipe 40, in the sour gas circulating in the pipe 3 between the valve 10 and the point for injecting the free oxygen-containing gas.

In order to cool the catalyst of the converter 2b at the end of its regeneration by the hot sweeping gas, the valve 32b is shut down and the valve 37b is opened up to inject into the sweeping circuit of the said catalyst, along the pipe 36b through the valves 37b, the gaseous flow tapped through pipe 38 and the sour gas passing, in the pipe 7, from the first heating device 8 to the second heating device 9 and presenting a temperature lower than about 160° C.

When the catalyst of the converter 2b has been cooled to a suitable temperature allowing the contacting of the said catalyst with the gaseous effluent issued from the oxidation reactor, the functions of the converters 2a and 2b are permutated by closing down valves 21a, 23b, 29a, 32b and 37b and opening up valves 21b, 23a, 29b and 32a then during the cooling stage of the catalyst by opening up the valve 37a and by closing down the valve 32a. As indicated herein-above in the case of the device represented on FIG. 1, during the transient period of permutation of the role of the converters the sweeping gas is brought to circulate in a pipe (not represented) by-passing these converters.

To complete the foregoing description, a non-limitative example of carrying out the process of the invention will now be given.

EXAMPLE

By means of a device similar to that schematically represented on FIG. 1 of the appended drawing and operating as described herein-above, a sour gas having a low $H_2S$ content which contained by volume 4.2% $H_2S$, 5.9% water and 89.9% $CO_2$ was treated.

The catalyst used in the oxidation reactor 1 was constituted by a layer of extruded materials having diameter of about 4 mm, and consisting of titanium oxide containing 10% by weight calcium sulfate, followed by a layer of beads of 4 to 6 mm in diameter consisting of activated alumina impregnated with iron sulfate (4% by weight of iron in the calcinated catalyst) while the CLAUS catalyst present in each of the converters 2a and 2b was constituted by activated alumina beads whose diameter was from 4 to 6 mm. The contacting times of the gases, under normal temperature and pressure conditions, with titanium oxide, alumina impregnated with iron sulfate and the CLAUS catalyst were respectively of 3 seconds, 2 seconds and 8 seconds.

The sour gas arriving along the pipe 7 with a flow-rate of 285 kmoles/hour, was brought to about 130° C. in a heating device 8 then to about 300° C. in the heating device 9.

Through the pipe 33, 120 kmoles/hour of sour gas issued from the heater 9 are tapped in order to constitute the sweeping gas used for regenerating the sulphur-laden catalyst.

Through the pipe 13, about 28 kmoles/hour air are injected into the sour gas arriving along the pipe 3 and the resulting gaseous mixture is maintained at 200° C. at the inlet of the oxidation reactor 1.

The gaseous effluent issued from the said reactor, through the pipe 4, contained $H_2S$ and $SO_2$ in a $H_2S:SO_2$ molar ratio equal to about 2:1 and also a certain quantity of elementary sulphur. The said gaseous effluent was cooled, in the condensor 5, in order to separate the greatest proportion of the sulphur through condensation and issued from the said condensor 5 with a flow-rate of 308.5 kmoles/hour, a temperature of about 130° C. and volume content in $H_2S$ and $SO_2$ respectively equal to 0.84% and 0.42%. The recovery yield of the sulphur in the condensor was equal to 66.4%. The gaseous effluent issued from the condensor 5 entered with a temperature of 127° C. into the converter 2a operating in CLAUS reaction phase.

The purified gas issuing from the converter 2a through the pipe 19a, had a temperature of about 130° C. and has a total content in sulphur-based products equal to 600 p.p.m. by volume.

The converters 2a and 2b operated alternately during 30 hours in CLAUS reaction phase and for 30 hours, of which 10 hours of cooling, in regeneration/cooling phase.

The gas issued from the sulphur condenser 26 arrived at the aspiration of the blower 25 at a temperature of about 130° C.

The overall transformation rate into sulphur of $H_2S$ contained in the sour gas was equal to 98.4% and was substantially maintained at this value over a period of several months.

We claim:

1. A catalytic process for producing sulphur from a sour gas containing $H_2S$ in a concentration ranging from about 0.2 to about 20% by volume, which comprises:
   (a) feeding a stream of said sour $H_2S$-containing gas which is substantially free of sulphur and $SO_2$ and splitting the sour gas into two portions, one portion being fed to the $H_2S$ oxidation catalyst for partial oxidation of the $H_2S$ within the sour gas and the other portion being fed to a sulphur-laden CLAUS catalyst for regeneration of the CLAUS catalyst, feeding the portion of sour gas for partial oxidation with a controlled and limited quantity of a gas containing free oxygen to a $H_2S$ oxidation catalyst, partially oxidizing the $H_2S$ to sulphur and $SO_2$, while operating at a temperature above 150° C. and producing a gaseous effluent containing $H_2S$ and $SO_2$ in a $H_2S$ to $SO_2$ molar ratio of about 2:1 and elemental sulphur,
   (b) cooling said gaseous effluent to a temperature lower than about 160° C.,
   (c) contacting the cooled gaseous effluent from step (b) with the CLAUS catalyst at a sufficiently low temperature for the $H_2S$ to react with $SO_2$ and forming sulphur which is deposited on the catalyst and forming a substantially desulphurated gaseous effluent stream,
   (d) periodically regenerating the sulphur-laden CLAUS catalyst from step (c) by sweeping said catalyst with said other portion of the sour gas at a temperature between about 200° C. and 500° C., and recovering the sweeping gas after regeneration of the catalyst,
   (e) cooling the regenerated CLAUS catalyst to a temperature below about 160° C. suitable for further contacting with the gaseous effluent from step (b), and
   (f) recycling the $H_2S$-containing sweeping gas which is substantially free of sulphur and $SO_2$ recovered from the regeneration of the sulphur-laden CLAUS catalyst in step (d) and mixing the sweeping gas recovered from the regeneration of the sulphur-laden CLAUS catalyst in step (d) with the stream of sour gas, feeding one portion of the mixture of sweeping gas and sour gas to the $H_2S$ oxidation catalyst for partial oxidation of the $H_2S$ within the mixture and feeding the other portion of the mixture for regeneration of the sulphur-laden CLAUS catalyst.

2. The process of claim 1, wherein the $H_2S$ oxidation catalyst comprises at least one compound of a metal selected from the group consisting of Fe, Ni, Co, Cu, and Zn in contact with a support consisting of at least one member selected from the group consisting of alumina or silica.

3. The process of claim 1, wherein the $H_2S$ oxidation catalyst is a titanium oxide based catalyst.

4. The process of claim 1, wherein the $H_2S$ oxidation catalyst comprises at least one compound of a metal selected from the group consisting of Fe, Cu, Cd, Zn, Cr, Mo, W, Co, Ni, and Bi, in contact with a support consisting of at least one member selected from the group consisting of silica or titanium oxide.

5. The process of claim 1, wherein the $H_2S$ oxidation catalyst comprises at least one compound of a metal selected from the group consisting of Fe, Cu, Cd, Zn, Cr, Mo, W, Co, Ni, and Bi in contact with a thermally stabilized active alumina support.

6. The process of claim 2, wherein the $H_2S$ oxidation temperature of the oxidation catalyst is between about 150° C. and 400° C.

7. The process of claim 3, wherein the $H_2S$ oxidation temperature of the oxidation catalyst is between about 150° C. and 500° C.

8. The process of claim 4, wherein the $H_2S$ oxidation temperature of the oxidation catalyst is between about 150° C. and 700° C.

9. The process of claim 5, wherein the $H_2S$ oxidation temperature of the oxidation catalyst is between about 150° C. and 1000° C.

10. The process according to claim 3, wherein the $H_2S$ oxidation catalyst comprises a second catalyst surface layer that results from the association of at least one compound of a metal selected from the group consisting of Fe, Ni, Co, Cu and Zn with a support selected from the group consisting of alumina and silica.

11. The process according to claim 4, wherein the $H_2S$ oxidation catalyst comprises a second catalyst surface layer that results from the association of at least one compound of a metal selected from the group consisting of Fe, Ni, Co, Cu and Zn with a support selected from the group consisting of alumina and silica.

12. The process according to claim 5, wherein the $H_2S$ oxidation catalyst comprises a second catalyst surface layer that results from the association of at least one compound of a metal selected from the group consisting of Fe, Ni, Co, Cu and Zn with a support selected from the group consisting of alumina and silica.

13. The process according to claim 10, wherein the $H_2S$ oxidation temperature of the oxidation catalyst is between about 150° C. and about 400° C.

14. The process according to claim 11, wherein the $H_2S$ oxidation temperature of the oxidation catalyst is between about 150° C. and about 400° C.

15. The process according to claim 12, wherein the $H_2S$ oxidation temperature of the oxidation catalyst is between about 150° C. and about 400° C.

16. The process of claim 3, wherein the oxidation catalyst comprises an association of titanium oxide and an alkaline-earth metal sulfate.

17. The process of claim 3, wherein the oxidation catalyst comprises titanium oxide and calcium sulfate.

18. The process of claim 4, wherein the oxidation catalyst further includes at least one compound of a noble metal selected from the group consisting of Pd, Pt, Ir and Rh.

19. The process of claim 5, wherein the oxidation catalyst further includes at least one compound of a noble metal selected from the group consisting of Pd, Pt, Ir and Rh.

20. The process of claim 5, wherein the support of oxidation catalyst consists essentially of an active alumina support thermally stabilized by at least one rare earth oxide.

21. The process of claim 19, wherein the support of the oxidation catalyst consists essentially of an active alumina support thermally stabilized with at least one rare earth oxide.

22. The process of claim 1, wherein the regenerated low temperature CLAUS catalyst of step (d) is cooled in step (e) with the sweeping gas after lowering the temperature of the gas to below about 160° C.

23. The process of claim 1, wherein the regenerated low temperature CLAUS catalyst is cooled by sweeping with a part of the sour gas to be treated when the said sour gas is still at a temperature lower than about 160° C. and not yet combined with the free oxygen-containing gas, and wherein the cooling gas is reinjected, after contacting the CLAUS catalyst, into the sour gas stream for step (a) before the sour gas stream is combined with the free oxygen-containing gas.

24. The process of claim 1, wherein the gaseous effluent from $H_2S$ oxidation in step (a) is contacted with a high temperature CLAUS catalyst which functions at a temperature sufficiently high for the sulphur formed by reaction of $H_2S$ with $SO_2$ to remain in the vapor state, prior to being contacted with the low temperature CLAUS catalyst in step (c) the said high temperature CLAUS catalyst being disposed in a catalytic conversion zone, or in a plurality of such zones disposed in series wherein the working temperature successively decreases from one zone to the next.

25. The process of claim 1, wherein the CLAUS catalyst comprises a material selected from the group consisting of alumina, bauxite, silica, and zeolite.

26. The process of claim 1, wherein the desulphurated gaseous stream from step (c) is treated by incineration.

27. The process of claim 1, wherein the sweeping gas recovered from step (d) is substantially freed from the sulphur that it contains by condensation before recycling to step (a).

28. The process of claim 1, wherein the gas containing free oxygen is combined with the sour gas stream in step (a) before the gas stream is contacted with the oxidation catalyst.

29. The process of claim 1, further comprising in step (b) the step of removing by condensation from the gaseous effluent substantially all the sulphur contained therein.

30. The process of claim 1, wherein the sweeping gas is mixed upstream from the $H_2S$ oxidation catalyst with the one portion of sour gas.

31. The process of claim 1, wherein the CLAUS catalyst comprises at least one compound of a metal selected from the group consisting of Fe, Ni, Co, Cu and Zn in contact with a support consisting of at least one member selected from the group consisting of alumina and silica.

* * * * *